T856-019

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 336

656,370

THERMAL STABILIZED POLYETHYLENE SULFIDE

Ephraim H. Catsiff, Trenton, N.J., and Stephen W. Osborn, Newtown, Pa., assignors to Thiokol Chemical Corporation, Bristol, Pa., a corporation of Delaware

Filed July 27, 1967. Published Nov. 12, 1968

Class 260—45.75

No Drawing. 20 Pages Specification

Ethylene sulfide polymers are made thermally stable by incorporating (1) a tin compound, as for example, the oxides, carbonates, hydroxides, halides and sulfates of tin; alkali metal stannates; hydrocarbyl tin and its hydroxides, oxides, acids and mercaptoesters; hydrocarbyl tin acid salts; and stannous esters of mono- and polycarboxylic acids; and (2) an organic nitrogen compound, examples of which are, the amides, monomeric amines, substituted amines, polyamines and compounds containing nitrogen in ring structure.

Such stabilized polyethylene sulfide resins are useful in the manufacture of molded, extruded and film forms of articles such as rods, pipes and pumps.